(12) United States Patent
Torkington

(10) Patent No.: US 12,517,834 B2
(45) Date of Patent: *Jan. 6, 2026

(54) FLEXIBLE CACHE STRUCTURE FOR CACHING COMPRESSED AND UNCOMPRESSED DATA

(71) Applicant: Imagination Technologies Limited, Kings Langley (GB)

(72) Inventor: Ross Martin Torkington, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 10 days.

This patent is subject to a terminal disclaimer.

(21) Appl. No.: 18/588,532

(22) Filed: Feb. 27, 2024

(65) Prior Publication Data

US 2024/0320156 A1    Sep. 26, 2024

(30) Foreign Application Priority Data

Feb. 27, 2023  (GB) ...................... 2302800
Feb. 27, 2023  (GB) ...................... 2302814

(51) Int. Cl.
  *G06F 12/0877*  (2016.01)
  *G06F 12/0895*  (2016.01)
(52) U.S. Cl.
  CPC ...... *G06F 12/0877* (2013.01); *G06F 12/0895* (2013.01)
(58) Field of Classification Search
  CPC .................. G06F 12/0877; G06F 12/0895

USPC .......................................................... 711/118
See application file for complete search history.

(56) References Cited

U.S. PATENT DOCUMENTS

| | | | |
|---|---|---|---|
| 9,798,668 B2 | 10/2017 | Reed | |
| 2001/0003840 A1* | 6/2001 | Dimarco | G06F 12/0886 711/212 |
| 2001/0044875 A1 | 11/2001 | Mailloux et al. | |
| 2004/0117578 A1 | 6/2004 | Castelli et al. | |
| 2006/0277352 A1* | 12/2006 | Pong | G06F 12/0802 711/3 |
| 2013/0346696 A1* | 12/2013 | Park | G06F 12/0875 711/122 |
| 2016/0179677 A1 | 6/2016 | Matas et al. | |
| 2016/0274968 A1 | 9/2016 | Warnes et al. | |
| 2017/0046261 A1 | 2/2017 | Umeda et al. | |
| 2017/0286151 A1* | 10/2017 | Landers | G01N 33/0073 |
| 2017/0371793 A1* | 12/2017 | Saidi | G06F 12/0895 |

(Continued)

*Primary Examiner* — Jared I Rutz
*Assistant Examiner* — Wei Ma
(74) *Attorney, Agent, or Firm* — Potomac Law Group, PLLC; Vincent M DeLuca

(57) ABSTRACT

A device in which each field in a first RAM together with a respective field in a second RAM form a respective entry of a cache RAM. Caching circuitry is operable to use the respective field in the first RAM to hold a first portion of a single cacheline, and the respective field in the second RAM to hold the corresponding tag of the single cacheline and a remaining portion of the single cacheline. The caching circuitry is further arranged so as, upon a cache hit by a subsequent memory access operation requesting to access data for which a corresponding cacheline has already been cached, to retrieve the corresponding tag and the remaining portion of the respective cacheline from the second RAM in a first one of a sequence of clock cycles.

20 Claims, 4 Drawing Sheets

(56) References Cited

U.S. PATENT DOCUMENTS

| | | | | |
|---|---|---|---|---|
| 2023/0133372 A1* | 5/2023 | Abali | .................. | G06F 12/0806 |
| | | | | 711/146 |
| 2023/0195638 A1* | 6/2023 | Uhrenholt | ........... | G06F 12/0808 |
| | | | | 711/118 |

* cited by examiner

FLEXIBLE CACHE STRUCTURE FOR CACHING COMPRESSED AND UNCOMPRESSED DATA

CROSS-REFERENCE TO RELATED APPLICATIONS AND CLAIM OF PRIORITY

This application claims foreign priority under 35 U.S.C. 119 from United Kingdom Application Nos. 2302800.4 and 2302814.5, both filed on 27 Feb. 2023, the contents of which are incorporated by reference herein in their entirety.

BACKGROUND

A processor usually includes a cache to supplement a source memory. When data is retrieved from the source memory, the data may get cached so as to be made available in the cache in case that data is to be used again shortly after. The cache comprises a temporary storage location that is smaller in terms of data capacity than the source memory, but physically closer to the execution pipeline and faster to access. The unit of data that gets cached is known as a "cacheline", and this will include a copy of the data that was the target of the data access operation in question. In other words the cache caches data with a certain granularity, in units of discrete cachelines, and if a memory access operation accesses an item of data from memory that is not already found in the cache then the cache will cache a cacheline that comprises the accessed item of data. For example, the processor might access 32 bits or 64 bits of data from within a 512-bit (64-byte) cacheline. If the data access misses in the cache then the entire 512-bit cacheline is retrieved from source memory and put in the cache so that the data being accessed is available to be used again shortly after, and nearby data (data within the same cacheline) is also available for quick access.

A cache usually comprises a tag RAM that holds address information and a data RAM that holds the actual cached data (the cachelines). These are illustrated schematically as components 202 and 201 of cache RAM 112 in FIG. 2. Each of the data RAM and the tag RAM comprises a plurality of fields of an architecturally fixed width (i.e. width in bits). E.g. each field in the data RAM may be 64 bytes wide for holding a 64-byte cacheline. Each field in the tag RAM corresponds to a corresponding field in the data RAM, which together form a respective cache entry.

The tags are typically smaller than the cachelines, so the fields in the tag RAM are typically shorter accordingly. For example a tag RAM might typically be 20 bits wide. An address is typically 32 bits (though it can be larger) and for a 64 byte cacheline, bits 31 to 6 of the address typically form the address of the cacheline and the lower 6 bits (bits 5 to 0) form the address of the first byte within that cacheline that a load or store instruction is accessing. The tag RAM only needs to store the upper address bits—the ones that indicate which cachelines are contained in the cache. The lower 6 bits do not need to be stored. Some of the upper address bits are stored in a tag RAM entry. These bits are referred to as the address tag. The remaining upper address bits are used as an index into the tag RAM. The number of address bits that are used as the tag and the number of address bits that are used as the tag RAM index varies depending on the cache size and structure. E.g. for a 32 KB cache (fairly typical for an L1 cache) the cache requires 512 entries (512×64 byte cachelines=32 KB). If the cache is, for example, 4-way set-associative, then the 512 entries are divided into 4 banks of 128 entries that can be looked up in parallel. For 128 entries one would need 7 of the upper address bits (remember the upper address bits are bits 31 to 6) to act as a tag RAM index. The remaining 19 upper address bits form the tag that is stored in the tag RAM entry. So in this example the tag RAM would need to be at least 20 bits wide in this case (19 bits for the tag and 1 bit to indicate whether the entry contains valid information or not).

Caches can be implemented to support the retrieval of a number of different types of data. For example, the data in question could be operand data loaded by the load/store unit (LSU) of the processor's pipeline in response to executing one or more load instructions, or it could be one or more instructions fetched by a fetch unit of the pipeline, or it could even be data being retrieved by some other component other than the pipeline, such as a DMA (direct memory access) engine.

When the data is requested from memory, then dedicated caching hardware checks whether the address of the requested data is found to correspond to a tag in the tag RAM. If so (a cache hit), the hardware will retrieve the requested data from the corresponding field in the data RAM of the cache instead of from the source memory.

Conventionally, data is simply cached in an uncompressed form. It has also been proposed to cache data in a compressed form. In that case the cached data is automatically compressed into the form of a compressed cacheline upon caching, and automatically decompressed when retrieved again from the cache upon a cache hit. An example of cache compression can be applied, for example, when one half of the bits of the data to be cached comprises all zeros, in which case those bits can be removed for caching and then automatically added again when retrieved upon a cache hit. Another example would be if the data comprises a repeated pattern of bits, in which case it is possible to cache only one instance of the repeated pattern and then duplicate it again upon a cache hit. The aim of cache compression is so that the data RAM can be made smaller in size, so as to save on silicon area, or that effective capacity of the data RAM is increased while maintaining the same silicon area.

SUMMARY

According to a first aspect disclosed herein, there is provided a device comprising: cache RAM comprising first RAM and second RAM; and caching circuitry arranged to perform caching operations in response to memory access operations, each caching operation caching a respective cacheline and corresponding tag in the cache RAM. The first RAM comprises a plurality of fields of an architecturally defined width, and the second RAM comprises a plurality of respective fields also of architecturally defined width, each field in the first RAM together with the respective field in the second RAM forming a respective entry of the cache RAM. According to the first aspect disclosed herein, the caching circuitry is operable to use the respective field in the first RAM to hold a first portion of a single cacheline, and the respective field in the second RAM to hold the corresponding tag of the single cacheline and a remaining portion of the single cacheline. The caching circuitry is further arranged so as, upon a cache hit by a subsequent memory access operation requesting to access data for which a corresponding cacheline has already been cached, to retrieve the corresponding tag and the remaining portion of the respective cacheline from the second RAM in a first one of a sequence of clock cycles.

This advantageously provides the ability to reduce latency by accessing a portion of the cacheline from the flexible second RAM in the same cycle as the tag. This may be contrasted against existing caches in which either the cacheline is read out in a subsequent cycle after reading the tag, which is slower, or else the entire cache entry is read in one same cycle, which is more power hungry.

Another issue with the previously proposed cache compression techniques is that they are either inflexible or wasteful.

In one previously proposed technique, the data RAM is designed with only the width of one compressed cacheline. This is illustrated schematically in FIG. 3. However this means that if there is data which cannot be compressed, then either this data simply cannot be cached, or else a separate cache has to be provided to handle uncompressible data (and providing a separate cache has various disadvantages in itself, which may include latency, power consumption, and/or memory congestion).

In another previously proposed technique, the data RAM is made wide enough such that each field can accommodate either one uncompressed cacheline or a plurality of compressed cachelines. However this means that in order to accommodate the case of caching multiple compressed cacheline in one field of the data RAM, the corresponding field in the tag RAM has to be made wider so that it can accommodate multiple tags (one per compressed cacheline in the corresponding field of the data RAM). This is illustrated schematically in FIG. 4. This in turn means that, in the case of caching an uncompressed cacheline, then some of the space in the corresponding field of the tag RAM is now wasted (it has been designed to be wide enough to hold multiple tags but is only being used to store one tag).

It would be desirable to provide a cache structure that can flexibly store cachelines in different formats (e.g. compressed and uncompressed), but which is less wasteful of space than existing designs.

According to a second aspect disclosed herein, there is provided a device comprising: cache RAM comprising first RAM and second RAM; and caching circuitry arranged to perform caching operations in response to memory access operations, each caching operation caching a respective cacheline and corresponding tag in the cache RAM. The first RAM comprises a plurality of fields of an architecturally defined width, and the second RAM comprises a plurality of respective fields also of architecturally defined width, each field in the first RAM together with the respective field in the second RAM forming a respective entry of the cache RAM. The caching circuitry is operable to make a selection between applying a first mode and a second mode in at least one of the entries in the cache RAM. When the first mode is applied, the respective field in the first RAM is used to hold a first portion of a single cacheline in a first format, and the respective field in the second RAM is used to hold the corresponding tag of the single cacheline and a remaining portion of the single cacheline. When the second mode is applied, the first RAM is used to hold a plural number of cachelines in a second format shorter than the first format, and the corresponding entry in the second RAM is used to hold the corresponding tags of the plural number of cachelines.

Thus the second RAM—what would conventionally just be a tag RAM—comprises a flexible part which can be used to hold either a tag in the case of the second, shorter cacheline format (e.g. compressed), or a portion of the cacheline in the case of the first format (e.g. uncompressed). The second RAM may be implemented in one or more physical RAM devices: the flexible part could be implemented in the same RAM device as the part used only for tags, or in a separate RAM device. Examples are shown in FIGS. 5 and 6, to be discussed in more detail later.

In embodiments of the second aspect, the first format may be an uncompressed form, and the second format may be a compressed form.

In embodiments of the second aspect, the format may be configurable statically by setting a value in a programmable control register or applying a value to some pins, in which case the setting applies over multiple caching operations until and unless the setting in the control register is reprogrammed. The static configuration could be applied to the cache as a whole, or a respective static setting could be applied to different regions of the cache, or even individual cache entries.

Alternatively the format may be configurable dynamically, i.e. individually for each individual caching operation and cache entry.

In embodiments of the second aspect, the caching circuitry is also operable to select between different variations of the first mode, and/or between different variations of the second mode; i.e. between different sub-modes of the first and/or second mode.

For example the available sub-modes of the second mode may use different variations of the second format (e.g. different compression schemes), or different values of said plural number (the number of cachelines per field in the second RAM). And/or the available sub-modes of the first mode may use different variations of the first format, or have different sizes of the first portion relative to the remaining portion (i.e. the sizes of the portions stored in the first and second RAM).

The first and second aspects may be used together or independently.

For instance, in embodiments of the second aspect, the device is arranged so as, upon a cache hit by a subsequent memory access operation requesting to access data for which a corresponding cacheline has already been cached according to the first mode, to retrieve the remaining portion of the respective cacheline from the second RAM in a first one of a sequence of clock cycles, and then to retrieve the first portion of the respective cachelines from the first RAM in a successive one of the clock cycles.

In embodiments of the first or second aspect there is provided a processing device (e.g. CPU, GPU, neural network accelerator or ethernet packet processor) comprising the disclosed device and an execution unit, wherein the memory access operations are performed by the execution unit or another component of the processing device. In embodiments there is provided a data processing system comprising the processing device and memory (comprising one or more memory units) wherein the memory access operations are operations to retrieve data from the memory. More generally however, the disclosed techniques could be applied in any device that retrieves and caches data from internal or external memory.

According to another aspect disclosed herein, there is provided a method of operating a processing device that comprises cache RAM comprising first RAM and second RAM, the first RAM comprising a plurality of fields of an architecturally defined width, and the second RAM comprising a plurality of respective fields also of architecturally defined width, each field in the first RAM together with the respective field in the second RAM forming a respective entry of the cache RAM. The method comprises: in a first of the entries of the cache RAM, caching a first cacheline and corresponding tag according to a first mode whereby the respective field in the first RAM is used to hold a first portion of the first cacheline in a first format, and the respective field in the second RAM is used to hold the corresponding tag of the first cacheline and a remaining portion of the first cacheline; and in a second of the entries of the cache RAM, or in the first entry at a different time, caching a plural number of second cachelines and corresponding tags according to a second mode whereby the first RAM is used to hold the second cachelines in a second format shorter than the first format, and the corresponding entry in the second RAM is used to hold the corresponding tags of the second cachelines.

The disclosed device or data processing system may be embodied in hardware on an integrated circuit. There may be provided a method of manufacturing, at an integrated circuit manufacturing system, a device or data processing system comprising the device in accordance with the present disclosure. There may be provided an integrated circuit definition dataset that, when processed in an integrated circuit manufacturing system, configures the manufacturing system to manufacture a device or data processing system. There may be provided a non-transitory computer readable storage medium having stored thereon a computer readable description of a device or data processing system that, when processed in an integrated circuit manufacturing system, causes the integrated circuit manufacturing system to manufacture an integrated circuit embodying the device or data processing system.

There may be provided an integrated circuit manufacturing system comprising: a non-transitory computer readable storage medium having stored thereon a computer readable description of the device or data processing system; a layout processing system configured to process the computer readable description so as to generate a circuit layout description of an integrated circuit embodying the device or data processing system; and an integrated circuit generation system configured to manufacture the device or data processing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

This Summary is provided merely to illustrate some of the concepts disclosed herein and possible implementations thereof. Not everything recited in the Summary section is necessarily intended to be limiting on the scope of the disclosure. Rather, the scope of the present disclosure is limited only by the claims.

BRIEF DESCRIPTION OF THE DRAWINGS

Examples will now be described in detail with reference to the accompanying drawings in which.

Figure 1:
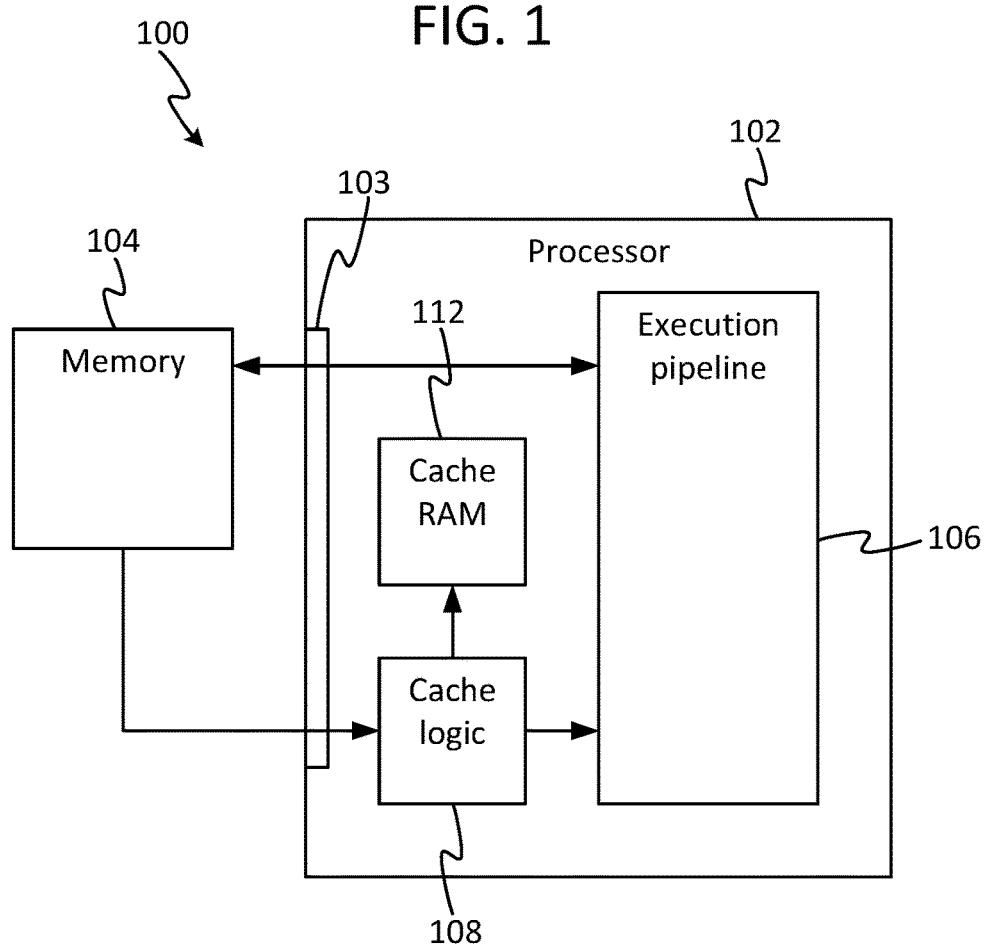
FIG. 1 is a schematic block diagram of a processing system.

The accompanying drawings illustrate various examples. The skilled person will appreciate that the illustrated element boundaries (e.g. boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

FIG. 1 schematically illustrates some of the main components of a data processing system 100. The processing system 100 comprises a processing device 102, and a memory 104. The processing device 102 comprises at least one processor, e.g. a central processing unit (CPU); or an accelerator processor or application specific processor such as a graphics processing unit (GPU), artificial intelligence (AI) accelerator processor (e.g. neural network accelerator), digital signal processor (DSP), Ethernet packet processor or crypto processor. The processing device 102 is incorporated within an integrated circuit (IC), also known as a chip or die.

The (or each) processor of the processing device 102 comprises an execution pipeline 106. The system 100 also comprises a cache comprising cache logic 108 and cache RAM (random access memory) 112. The cache logic 108 is implemented in dedicated hardware, i.e. fixed-function circuitry, and may also be referred to herein as the caching circuitry. The cache RAM 112 may be implemented in one or more RAM devices, as will be discussed in more detail shortly. The cache logic 108 and cache RAM may be implemented as part of the same processor core as the pipeline 106, or elsewhere on the same die, or a combination.

The memory 104 may be referred to herein as the source memory in that it is a source of data to be cached. This does not necessarily imply it is the ultimate source of the data. The source memory 104 may be implemented in one or more memory devices. The source memory 104 may comprise volatile memory (e.g. RAM) and/or non-volatile memory. The source memory 104 may employ one or more memory media, e.g. an electronic medium such as DRAM (dynamic RAM), SRAM (static RAM), ROM (read only memory), PROM (programmable ROM), EEPROM (electronically erasable and programmable ROM), flash memory, or SSD (solid state drive); or a magnetic medium such as a HDD (hard disk drive), magneto-optical memory or magnetic tape; or any combination of these and/or other memory media types. The source memory 104 may be implemented externally to the IC on which the processor(s) of the processing device 102 are implemented, e.g. on the same board or in the same housing but externally to the IC; or the source memory 104 may be implemented on the same IC but externally to the processing core of the processor(s), e.g. being on the same IC but accessed via an internal bus. For instance in one embodiment the source memory 104 is external to the CPU core but on the same chip and connected by an on-chip interface such as an AXI interface. If a memory access operation such as load or store misses in the CPU cache(s) then the CPU will make a read or write request on its external memory interface (e.g. AXI interface). As another alternative the source memory 104 may even be implemented in the same core as the pipeline 106 but nonetheless physically further from the pipeline 106 than the cache RAM 112. In one possibility the source memory 104 could comprise a higher layer of cache in a layered cache arrangement. The source memory 104 may also comprise a combination of different memory devices implemented in different locations.

The processing device 102 further comprises an interface 103 for connecting to the source memory 104. The interface 103 may represent any suitable interface to the type(s) of internal or external source memory in question. E.g. the interface 103 may comprise an internal bus or other interconnect (such as a crossbar interconnect) to a source memory on the same IC, or a port able to connect to an external source memory. The processing device 103 may be sold in a form with the source memory 104 already connected to the interface 103 (e.g. on the same IC), or in a form enabling a downstream manufacturer or consumer to connect the source memory 104 to the interface (e.g. via an external port). Either way, the interface 103 allows one or more components of the processing device 102, such as the pipeline 106 or a DMA engine (not shown) to retrieve data from the source memory 104.

Wherever implemented, the source memory 104 is slower for the pipeline 106 to access compared to the cache RAM 112, typically because it is larger in terms of data capacity and/or implemented physically further away from the pipeline 106 in the design. For this reason caching is commonly employed in order to speed up retrieval of repeatedly accessed data.

When data is loaded from a source memory 104 it may get cached in case that data is to be used again shortly after. The cache is a temporary storage location that is smaller in terms of data capacity than the general purpose memory, but closer to the execution pipeline and faster to access. Various possible caching policies for determining which data to cache and which data to evict from the cache are, in themselves, known in the art.

Figure 2:
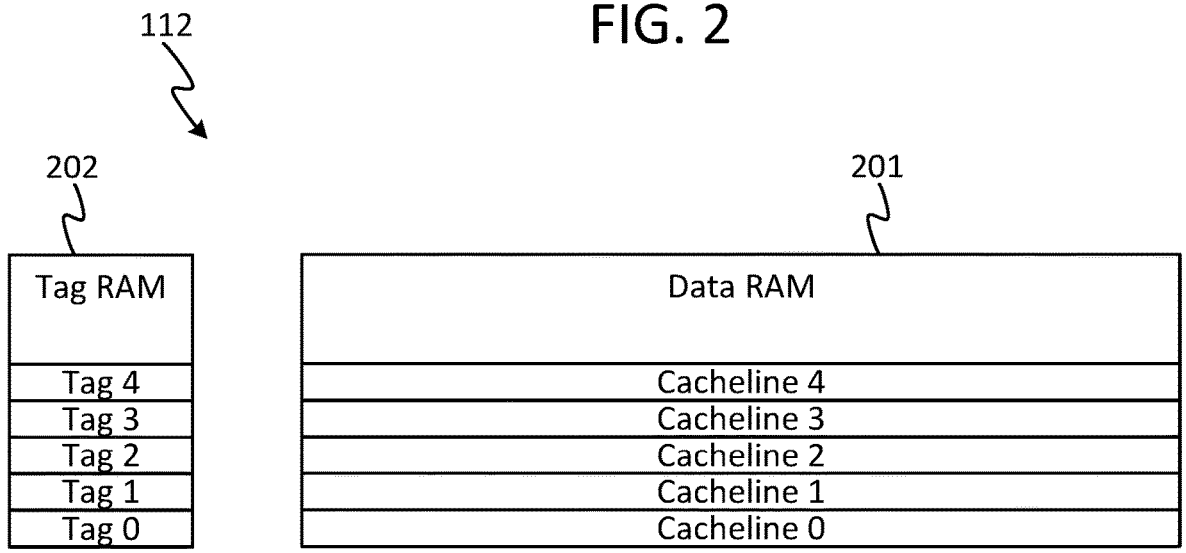
FIG. 2 is a schematic illustration of a conventional cache structure.

FIG. 2 shows the structure of a conventional implementation of the cache RAM 112. The cache RAM 112 comprises two constituent areas of RAM: some first RAM 201 in the form of data RAM and some second RAM 202 in the form of a tag RAM. The tag RAM 202 is arranged to hold address information and the data RAM 201 is arranged to hold the cached data (the cachelines). The first RAM 201 comprises a plurality of fields each of an architecturally defined bit-width, each for holding a respective cacheline; and the second RAM 202 also comprises a plurality of fields each of an architecturally defined bit-width, each for holding a respective tag. Architecturally defined width means at least that each individual field is fixed in size by the silicon design, and typically all the fields in the first RAM 201 are the same size as one another, and all the fields in the second RAM 202 are the same size as one another (though the fields in the second RAM 202 don't have to be the same size as the fields in the first RAM 201 and usually are not). Each field in the second RAM 202 corresponds to a corresponding field in the first RAM 201, which together form a respective cache entry. It will be appreciated that the illustration of only four entries in FIG. 2 is just to simplify the figure for illustrative purposes, and in practice there may be any number entries available, typically many more.

The second, tag RAM 202 and the first, data RAM 201 are normally separate RAM devices, but in principle the tag and data RAM could be implemented as different regions in the same physical RAM device. Separate RAM devices for the present purposes means the devices 201, 202 have their own independent addressing circuitry also independent data input and output circuitry, though the separate RAM devices may still be on the same chip. The reason that the tag RAM 202 and data RAM 202 are normally separate is so that the cache logic 108 can check for a cache hit in the tag RAM 202 before consuming power activating the data RAM, or to avoid activating the tag RAM in cases where the cache logic 108 already knows there will be a cache hit. Every RAM device has an area overhead associated with the address and data circuitry, independent of the area associated with storing information. In the case of multiple small RAMs that are identical in structure, it can be more area efficient to implement them as a single larger RAM device so as to consolidate the address and data circuitry. However, that has implications for power consumption.

The cache logic 108 is arranged to perform caching operations to cache cachelines and corresponding tags in response to memory access operations performed by the pipeline 106 and/or other component of the processing device 102, e.g. a data prefetcher or DMA engine. A data prefetcher looks at memory access patterns and tries to predict which memory locations will be accessed next. It then fetches those cachelines ahead of the explicit memory access operations that would otherwise trigger the cacheline fetches.

Each caching operation caches a respective cacheline and corresponding tag, wherein the respective cacheline comprises a copy of a corresponding line of data retrieved from the source memory 104 via the interface 103, and the corresponding tag comprises at least part of an address of the data in the memory 104. Note: in practice there will likely be a few bits of other information associated with each cacheline as well. The bits would indicate things like whether the cacheline entry is valid or invalid, whether the cacheline is dirty or clean (i.e. whether it contains updated data with respect to the data in source memory), what the memory attributes are (for example whether the cacheline is shareable or not shareable with other CPUs), and the cache-coherency state (indicating for example whether this cache is the only cache that currently holds a copy of the cacheline). These bits will often be included alongside the tag in the tag RAM, or sometimes in a separate RAM alongside the tag and data RAMs. For brevity these additional bits are not illustrated in the figures.

Each caching operation is performed in response to one or more memory access operations performed by the pipeline 106 or other component (e.g. data prefetcher of DMA engine), and the cached cacheline comprises a data item requested to be retrieved by the memory access operations.

In some cases the line of data copied as the cacheline may comprise a larger portion of data than the requested data item. E.g. if a cacheline is a certain size, say 64 bytes long, and the memory retrieval operation is only to retrieve a subset of those bytes, then a whole line of memory of size 64 bytes that includes the requested word(s) may get copied and cached in the data RAM as a cacheline. Alternatively there may be a one-to-one mapping between the size of data items requested by memory access operations and the size of the cachelines cached by caching operations. Either way, a caching operation could be performed in response to an individual respective memory access operation, or it could take more than one memory access operation from the same memory location to trigger a corresponding caching operation. Also, not every memory access operation results in a caching operation, depending on the caching policy employed.

The tag associated with a given cacheline may comprise only part of the address of the cacheline in memory. Some types of cache, such as an N-way set associative cache, do not allow a cacheline from a given address in memory to be cached in any arbitrary entry of the cache. Instead a part of the address range of the cachelines is used to determine a subset of cache entries that are allowed for caching a cacheline: typically the least significant portion of the address range. This may be referred to as the index. I.e. all the possible cachelines that share the same index can only be cached to a given subset of the cache entries. In such an arrangement, the index is used to narrow down the cache entries that need to be searched for cache hit. I.e. when a memory access is performed, the cache will go straight to the subset of cache entries mapped to the index of the cacheline that would contain the accessed piece of data if present. This means that only the remaining portion of the address range of the cachelines is needed to be stored in a cache entry as the tag, to search within the subset, as the index portion of the address is already implicit from indexing the cache. E.g. see the example given in the background section.

It will be appreciated by the skilled person that there are various possibilities for determining when and how much data to cache in response to what memory access operation (s), depending on the particular caching policy chosen by the designer, and various options for the associativity of the cache which will affect how much of the address of a cacheline is used as the tag. Various caching policies and associativity techniques in themselves will be known to a person skilled in the art and the details of these per se (e.g. what data gets cached and when) is not the focus of the present disclosure.

Whatever caching policy has been used to cache the data, the cache logic 108 is arranged such that if a further memory access operation requests a further instance of some data for which a corresponding cacheline has already been cached (i.e. a cache hit), then the cache logic 108 will detect this based on the tag in the second RAM 202. Then, instead of the further instance of the requested data being retrieved from the source memory 104, the cache logic 108 will intervene to instead retrieve the corresponding copy of the data from the first RAM 201 and supply this to the requesting component (e.g. the pipeline 106 or DMA engine). Note that when there's a cache hit, it is not necessarily required to retrieve the whole cacheline from the data RAM, but just the part of the cacheline that the memory access operation is targeting.

The data being cached and retrieved could be any form of data, depending on the purpose for which the cache is being implemented.

For example, when the load/store unit (LSU) of the execution pipeline 106 executes a load instruction to perform a load operation from an address specified by the operand of the load instruction, then this typically triggers the cache logic 108 to automatically check whether the address in question corresponds to a tag in the second RAM 201. If so (a cache hit), the cache logic 108 retrieves the corresponding cacheline from the corresponding entry in the first RAM 201 instead of from the source memory 104 and passes it to the LSU as if retrieved from memory 104 (the software does not have to "know" whether the data it gets comes from memory 104 or cache 112). Note again that the address and tag are not necessarily quite the same. The tag may be a subset of bits contained within the address. Only the tag bits need to be explicitly compared when looking for a cache hit because the relevant non-tag address bits are implicitly compared through using them as an index into the RAM. In other words, part of the address is used to select a relevant tag RAM entry (or entries) that might correspond to the cacheline being accessed. The tag bits stored in those entries are then compared against the tag bits of the address being accessed, and if they match then this is a cache hit.

A processor can also cache data due to store instructions. Store instructions might be counter-intuitive, but when a processor executes a store instruction that misses in the cache, it has a choice of writing the store data to external memory (equivalent to the source memory in the load case), or reading the data from external memory, updating it with the new store data, and putting it in the cache.

As another alternative or additional example of a type of data that might be cached, a processor can also cache instructions—these are fetched automatically by a fetch unit of the pipeline 106 without the need of load operations. Instructions are often cached in an instruction-side cache, separate from the data-side cache for caching operand data and/or results, but some processors use a single cache for storing both instructions and operand data.

A DMA engine could also add entries to a cache. E.g. some memory protocols have a concept of 'stashing' data in a target cache, allowing one processor to store data in another processor's cache.

As another example, a processor that implements virtual addressing also needs to perform 'pagetable walks' to convert virtual addresses to physical addresses. A pagetable walk can be triggered by an instruction fetch or a load/store instruction. The pagetable walk involves retrieving data from external memory, and this data can also be cached to speed-up future pagetable walks.

In general, memory access operations may refer to any type of operation, triggered by instructions or hardware, which requests any form of data (whether operand data, instructions or otherwise) to be retrieved from the source memory 104; and a caching operation may cache any such data in response to any one or more such memory access operations.

Existing caching techniques include the concepts of compressed and uncompressed caches. In an uncompressed cache the data is simply stored in uncompressed form, as shown in FIG. 2.

In a compressed cache on the other hand, the data is automatically compressed upon entry into the cache and uncompressed when it is retrieved again from the cache. Cache compression aims to store cacheline data using fewer bits in the data RAM, in order to reduce cache area or to increase the effective cache capacity. For example, if one contiguous half of the bits in a cacheline of data to be cached (e.g. an upper half or lower half) is all zeros, then when the data is cached that half of the data can be removed and then reinserted when the data is retrieved from the cache. So the cacheline consists of only the non-removed half. Or if the upper or lower three quarters are all zeros, then these can be stripped away and only the lower or upper quarter needs to be stored as a cacheline in the data RAM 201, etc. Another example would be if the data comprises a repeating pattern of a smaller sub-unit of contiguous bits of data, e.g. one half of the data is repeated in the other half, or one quarter is repeated in each of the other three quarters. In this case it is possible to store only the sub-unit of data in the cache and then expand the pattern again once the data is retrieved.

The compression and decompression is done automatically upon caching and cache retrieval, respectively, by the cache logic 108.

Figure 3:
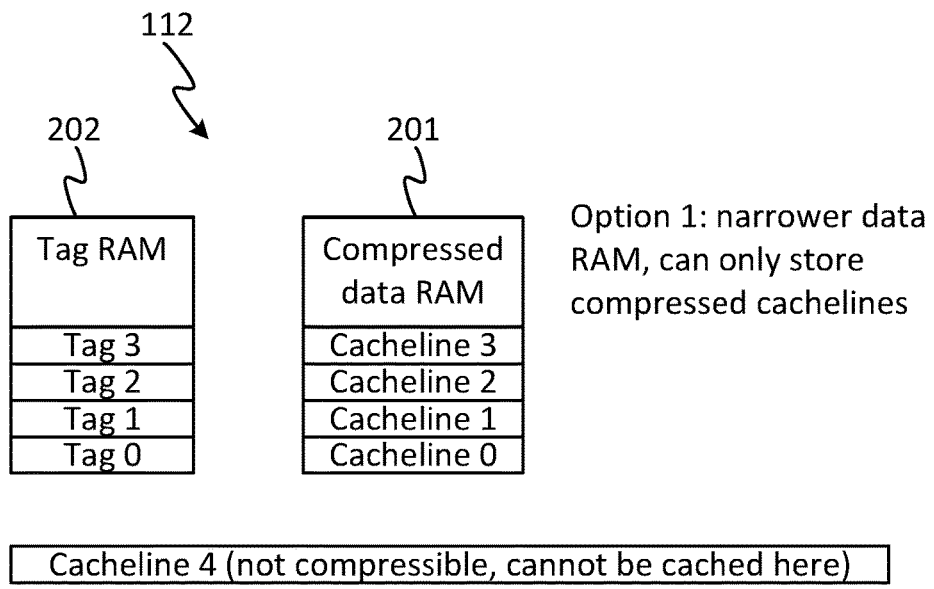
FIG. 3 is a schematic illustration of an existing cache structure for caching data in compressed form.

A version of the cache RAM 112 for use in a compressed cache is shown in FIG. 3. Here, each field in the data RAM 201 is narrower than in the uncompressed case of FIG. 2, being only the width of a compressed cacheline. However the fields of a cache RAM are fixed width slots, defined in the silicon implementation of the RAM device. If the cachelines of a given cache are stored in a compressed format then the data RAM can be made narrower, as in FIG. 3, saving on silicon area but removing the ability to store uncompressed cache lines. So if the data is not susceptible to being compressed according to the scheme being used (e.g. removing zeros), then either it simply can't be cached, or there has to be a separate cache device for caching uncompressible data elsewhere (which has its own disadvantages which may include latency, power consumption, and memory congestion).

Figure 4:
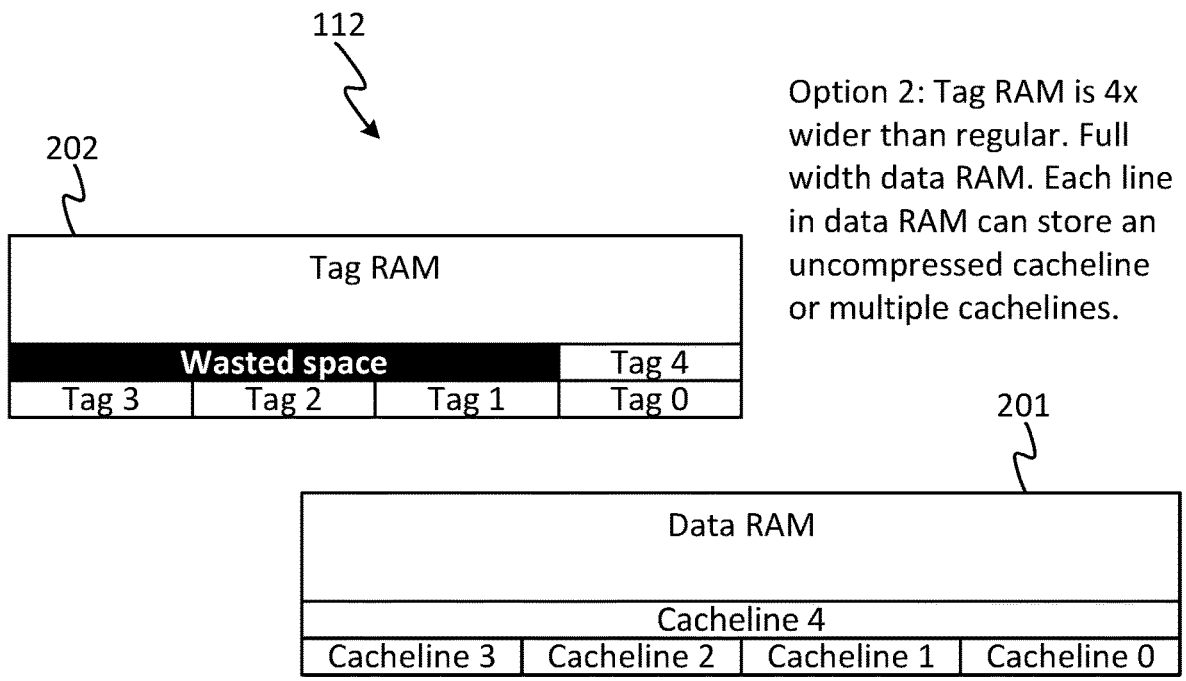
FIG. 4 is a schematic illustration of an existing cache structure for caching data in compressed and uncompressed form.

An alternative known option for a compressed cache is shown in FIG. 4. Here the fields of the data RAM 201 remain the same width as an uncompressed cache (as in FIG. 2), so one field can store either one uncompressed cache line or multiple compressed cache lines, thus increasing effective cache capacity, but requiring a larger tag RAM 202 as the tag RAM needs to be wider to accommodate as many addresses as there are compressed cachelines per entry. However this means that if a cache entry holds an uncompressed cacheline, then the respective field in the tag RAM 202 will contain only a single address, wasting the RAM area that has been added to store multiple addresses. See the space highlighted in black in FIG. 4. Say for example the compression scheme allows reducing the size of the data by a factor of four: in that case, a given field in the data RAM 201 can hold either one uncompressed cacheline or four compressed cachelines. But to account for the latter possibility, then each field in the tag RAM 202 needs to be four times wider than in an uncompressed cache—see the example in FIG. 4. This means that when uncompressed data is stored in a field line of the data RAM 201, then three out of four of the tag sub-fields in the corresponding field of the tag RAM 202 are wasted. Another alternative would be to only ever store one cacheline per entry regardless of whether compressed or uncompressed, but then a large amount of space would be wasted in the data RAM 201 when storing a compressed cacheline because each field needs to be wide enough to accommodate either a compressed or uncompressed data item.

Some workloads are well-suited to cache compression, others are not, and others fall somewhere in between. The above approaches benefit some workloads while penalising others (through reduced performance or increased area/ power consumption). Ideally, a cache structure would allow storage of compressed and uncompressed lines while avoiding the cost of unused address storage when storing uncompressed cache lines.

For example some operand data may be susceptible to compression (e.g. because it often contains a lot of zeros or repeating patterns), while other operand data may not. As another example, the same cache may be used for both operand data and instructions, but instructions are typically not as amenable to compression as operand data, so a shared cache would benefit from a structure optimized for the storage of both compressed and uncompressed cache lines.

The present disclosure provides a flexible tag & data cache RAM structure where a section of RAM acts as part of the tag RAM for compressed lines and as part of the data RAM for uncompressed lines.

Figure 5:
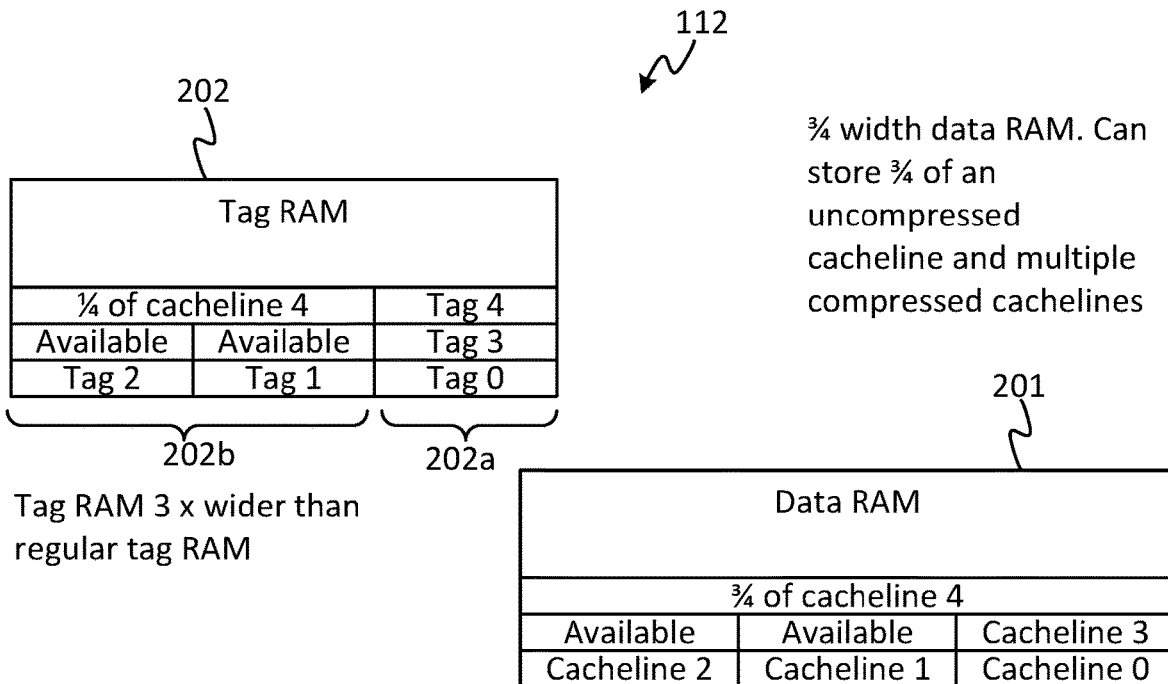
FIG. 5 is a schematic illustration of a cache structure for caching data in compressed and uncompressed form in accordance with embodiments of the present disclosure.

This is illustrated schematically in FIG. 5, where the cache RAM 112 comprises a modified form of the first and second cache RAM 201, 202. As discussed previously, the first RAM 201 comprises a plurality of fields of a certain architecturally defined width, and the second RAM 202 also comprises a plurality of respective fields of their own architecturally defined width. The width (in terms of number of bits) of each individual field is fixed by the silicon implementation of the IC in which the cache is incorporated, and most likely all the fields in the first RAM 201 will be the same width as one another, and all the fields in the second RAM 202 will be the same width as one another (though the fields in the second RAM 202 need not be the same width as the fields of the first RAM 201). And as also discussed previously, each field in the first RAM 201 together with a respective field in the second RAM forms a respective entry of the cache RAM 112.

According to the techniques disclosed herein, each entry in the first RAM 201 can be used to cache cacheline data (either whole or a part of a cacheline, as will be discussed in more detail shortly), and so the first RAM 201 may still be referred to as the data RAM. In addition, part of each field in the second RAM 202 can be used to hold tag information, but now the cache RAM structure is adapted compared to known cache structures so that part of each field in the second RAM 202 can flexibly be used to hold either tag information or partial cacheline data. The second RAM 202 may thus now be referred to as a flexible tag RAM.

The cache logic 108 is operable to make a selection between applying a first mode and a second mode in one, some or all of the entries in the cache RAM 112.

As shown in FIG. 5, when the first mode is applied to an entry in the cache RAM 112, then the respective field in the first RAM 201 is used to cache a first portion of a single one of the cachelines in a first, uncompressed form; and the respective field in the second RAM 202 is used to hold the corresponding tag of the single cacheline and the remaining portion of the single uncompressed cacheline. However when the second mode is applied, the field in the first RAM 202 is used to hold a plural number of the cachelines in a second, compressed format; and the corresponding field in the second RAM 202 is used to hold the corresponding tags of the plural number of cachelines.

In other words, the second RAM 202 (the flexible tag RAM) may be described as having a tag part 202*a* which is used to store tag information in both modes, and a flexible part 202*b* which is used for storing a partial uncompressed cacheline in the first mode and storing multiple tags in the second mode. And the first RAM 201 is used to store partial uncompressed cacheline data in the first mode, and multiple compressed cachelines in the second mode. In another embodiment, the flexible part of the tag RAM 202b could contain a mixture of tag and partial cacheline data in one or both modes, such as to make best use of the space available, depending on the compression algorithm or algorithms deployed. This is in contrast to FIG. 5 that shows the flexible part 202b being for tag information or partial data but not both.

More generally the idea could be extended to a cache RAM for flexibly storing cachelines in either a first format or a second format that is shorter (in terms of bit width) than the first format. The following will be described in terms of the first format being an uncompressed form, and the second format being a compressed form, but anywhere in the rest of the description that refers to compressed and uncompressed is cachelines could be more generally extended to cachelines in first and second formats. An example would be encrypted vs unencrypted data—the first format could be an encrypted format and the second format could be an unencrypted format, or vice versa. For security, a design might store information in an encrypted format so that if it were to leak (accidentally, through malicious software, or through sophisticated silicon tampering) then the damage would be limited. Some cachelines might be deemed sensitive with a need to be stored in an encrypted format while others might be non-sensitive and stored in an unencrypted format. Encrypted data can be smaller or larger than unencrypted data. If smaller this implies an element of compression, but the focus would be on maximising security rather than maximising the compression ratio. Alternatively, the encrypted data may be larger than the unencrypted data so a cache entry can either contain a single element of encrypted data (with some of the data stored in the flexible part of the RAM) or multiple elements of unencrypted data.

A second example would be mixed cacheline granularities, i.e. to apply the disclosed techniques to a memory system that uses different cacheline granularities for different memory regions. So the cache would support multiple cacheline widths such that a cache entry can contain a single large cacheline (with some of the data stored in the flexible part of the RAM) or multiple smaller cachelines. For example, some data cachelines may be X bytes in width and instruction cachelines may be Y bytes in width. In this case, one could use the flexible part of the tag RAM to store some of the data bytes when caching an X-byte cacheline, and use it to store a second tag if caching two Y-byte cachelines.

Another idea would be to store the part of the cacheline that is predicted will be accessed most often in the flexible part of the tag RAM so that it's more readily available (without having to spend more power and potentially more cycles to access the data RAM). This could be taken advantage of regardless of whether the cache supports compression In the example illustrated, the first mode stores three quarters of an uncompressed cacheline of a given entry in the respective field in the first RAM 201, and one quarter in the respective field in the second RAM 202; and the second mode can store up to three compressed cachelines in the respective field in the first RAM 201. This would allow each cache entry to store up to three cachelines if each cacheline can be compressed to fit in one of the quarter-cache-line-width data RAM banks. If the cache entry is configured (statically or dynamically) to hold an uncompressed cacheline instead, then the flexible part of the tag RAM 202b would be used to hold the remaining quarter of cache line data.

However it will be appreciated that other ratios are possible in other implementations, depending on the size of a tag and the size a compressed and uncompressed cacheline.

For instance, the scheme could be adapted or extended to allow, e.g., two compressed cachelines with a lower compression ratio. In this case the spare bits in the flexible RAM structure could be used to store extra information needed to decompress the cachelines. Alternatively, the spare bits could be used as extra data storage for one or both cachelines.

Also, again it will be appreciated that the small number of cache entries illustrated is just for the sake of the simplicity of the drawings, and in practice the cache RAM 112 would be expected to include many more entries.

As discussed previously, the first RAM 201 and second RAM 202 may be implemented in separate RAM devices, or as different regions in the same RAM device, preferably the former.

In a first variant of the presently disclosed RAM structure, the dedicated tag part 202a and the flexible part 202b of the second RAM 202 may be implemented in the same physical RAM device. I.e. the split of the first and second RAM between physical RAM devices follows the division between the separate boxes 201, 202 in FIG. 5.

An added benefit of storing part of the data for an uncompressed cache line in the same tag RAM entry as the tag information, is that some data accesses can be serviced by the tag RAM access, without waiting for the data RAM access. Tag and data RAM access are often performed in different clock cycles, where a clock cycle is one tick of the clock that shifts instructions along one pipeline stage of the pipeline 106. Some processors access the tag RAM and the data RAM in the same pipeline stage (same clock cycle). Other processors access the tag RAM in one pipeline stage and the data RAM in the next pipeline stage. Some processors take the first approach for one cache and the second approach for another cache in the same processor.

For example, in a level 1 cache, tag look-up and data retrieval might be done in one cycle, whereas in a level 2 cache data retrieval might be done in the next cycle.

The trade-off is that accessing the tag and data RAM in one-cycle is faster but burns more power. The reason for the higher power consumption is as follows. When the cache logic 108 looks for data in the cache, it knows what entry or set of entries to look in in the tag RAM based on the address of the memory access. It also knows the entry or set of entries where the data might be in the data RAM if the tag RAM indicates a cache hit, again based on the address of the memory access. Therefore, the cache logic can pre-emptively access the data RAM at the same time as the tag RAM and then use the data if the Tag RAM indicates a cache hit, or throw away the data if the Tag RAM indicates a cache miss. If the cache logic does this pre-emptive data RAM access for every memory-accessing operation, but ends up throwing away the data frequently, then more power has been consumed in the data RAM but that power is wasted because the required data wasn't there and the logic now has to access the next level cache or external memory.

Embodiments of the present disclosure can do a mix of the two approaches, as for some cacheline accesses the tag and relevant portion of uncompressed data are available together in the same entry of the flexible RAM (but for others not). E.g. see tag 4 in the flexible tag RAM in FIG. 5 and the associated quarter of cacheline 4 in the second RAM 202. A portion (e.g. quarter) of the data line might be useful to receive a cycle earlier than the rest, depending on the program.

Embodiments thus provide the ability to reduce latency by, in the first mode, accessing a tag and part of a cacheline from the flexible tag RAM in one cycle, then receiving the rest of the cacheline in the next cycle (though in the second mode it takes two cycles to get any of the data). The part of the cacheline chosen to store in the second RAM 202 could be either fixed or variable. E.g. in the fixed case, it might be that the upper or lower bits of the cacheline are always in the second RAM 202. Or in the variable case, one could store a 'critical' section of the cacheline in the second RAM 202. The 'critical' part of a cacheline may be the part that a memory-accessing instruction was trying to access when it missed the cache, and therefore the part of the cacheline that might be expected to be accessed more frequently. The rest of the cacheline is additional data that is pulled into the cache while accessing the critical section (because it's likely that the processor will want to access nearby data as well).

This benefit does not require the flexible part of the RAM to be in the same physical RAM device as the tag information, as long as the tag part 202a and flexible part 202b are accessed in the same cycle.

Figure 6:
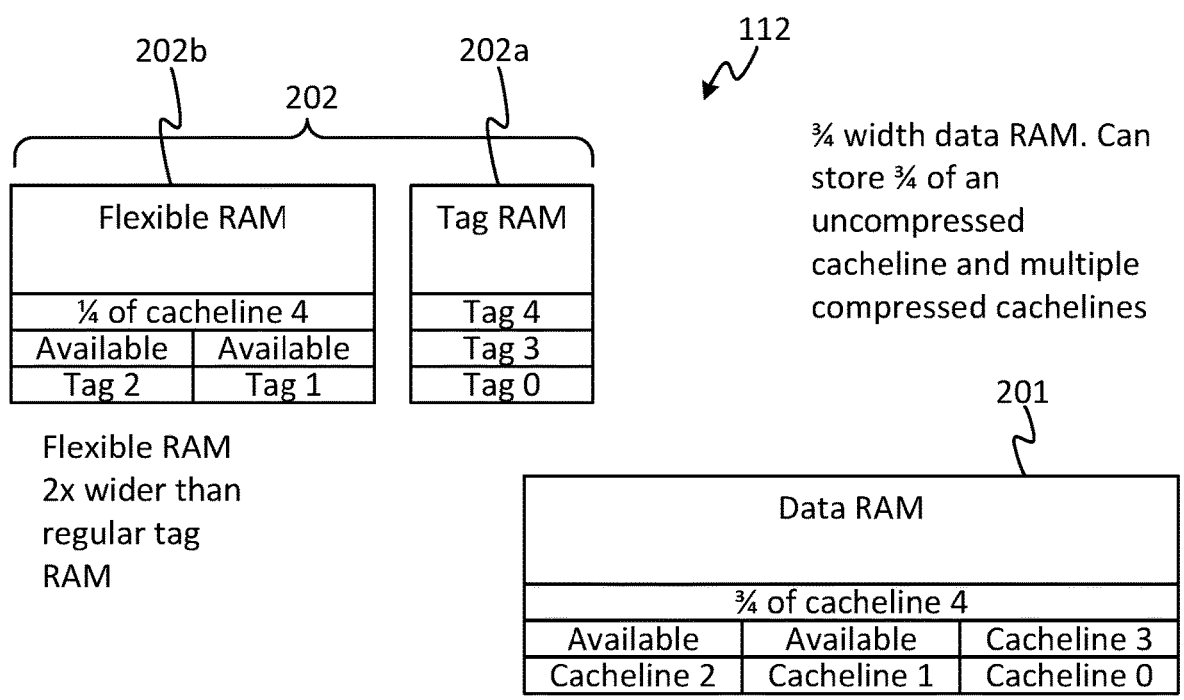
FIG. 6 is a schematic illustration of a cache structure for caching data in compressed and uncompressed form in accordance with further embodiments of the present disclosure.

Implementing the tag part 202a and flexible part 202b in the same RAM device is not essential. As a second, alternative variant, the functionality could be divided between three physical RAM devices: a dedicated data RAM device for the first RAM 201, a dedicated tag RAM device for the tag RAM part 202a, and a flexible tag/data RAM device for the flexible part 202b. This is shown in FIG. 6. Or as a third variant, the tag part 202a and flexible part 202b could be implemented in the same RAM device as the data RAM 201.

The first, second and third variants of the disclosed RAM structure are logically equivalent and just relate to how to implement the structure. It is more efficient to have the tag RAM and flexible part in the same RAM, as in the first variant. However the second variant gives more flexibility in terms of options for laying out the physical modules and wiring on chip.

Regardless of the physical split between RAM devices, the disclosed flexible formatting capability may be implemented across a group of some or all of the entries in the cache RAM 112. In some implementations, said group may be only a subset of all available entries in the cache RAM 112, whereas one or more others of the entries may support only a fixed format. Alternatively the capability to flexibly apply the first or second mode may be enabled across the entire cache RAM 112.

Either way, within the group of entries for which the flexible formatting is possible, there are different options for the granularity with which the selection between the first and second modes can be applied, depending in implementation. In embodiments, the selection between the first and second mode may only be configurable for the group as a whole (i.e. the same mode always applies to every entry in the group, e.g. the whole cache RAM 112). Alternatively, in other embodiments, the selection may be possible individually for each of a plurality of subsets of entries (so the same mode is applied to all the entries in a subsets but different subsets can have different modes applied). Or in yet further embodiments, the mode may even be selectable individually for each individual entry.

In some embodiments, the selection may further comprise selecting between different variations of the first mode, and/or selecting between different variations of the second mode. These could also be described as different sub-modes of the first and/or second modes (different ways in which one cacheline can be split between the first and second RAM 201, 202 as in the first mode; and/or different ways in which multiple, shorter cachelines can be stored in the second RAM 202 as in the second mode). For example, it may be possible to select between different compression schemes for the second mode; or to select between different sizes of the portions of the uncompressed cacheline stored in the first and second RAMs 201, 202; or to select the number of compressed cachelines to include in a field of the second RAM 202. Some of these sub-modes may also allow for storage of additional information. For instance, in a first variation (sub-mode) of the second mode the compressed cachelines and tags may fill the fields of the first and second RAM 201, 202 as shown in FIGS. 5 and 6; but in a second variation (sub-mode) of the second mode, there may be fewer compressed cachelines, perhaps with a lower compression ratio but still leaving some spare bits in the flexible RAM structure 202. In this case the spare bits could be used to store extra information needed to decompress the cachelines in the second sub-mode. Alternatively, the spare bits could be used as extra data storage for one or both cachelines.

Depending on the compression algorithm(s) used, a mix of tag information, partial compressed data, and information required to decompress the data could be included in a given entry of the second RAM 202.

The selection of mode and/or sub-mode could be statically or dynamically configurable.

Statically configurable means by one or more settings in one or more programmable control registers, or one or more settings applied or one or more input configuration pins of the IC package in which the processor 102 is incorporated. The setting of the configuration could be to turn on or off compression for the whole cache, or turn it on for some cache entries and off for others, or some regions of memory and not others. If compression is turned on, in some embodiments the settings may also select what compression scheme to use. As another alternative or additional possibility, the configuration could select the maximum number of compressed cachelines that can be stored per entry, the maximum number of bits that can be allocated to a compressed cacheline, which bits of the flexible part of the tag RAM contain tag information versus partial data or decompression information for compressed cachelines, and/or which memory address regions to include or exclude from compression (though the architectural width of the data and tag RAMs would remain the same). Such selectable configuration options could be used to set up the cache to be optimized for a given workload. The setting(s) in the control register(s) could be programmable by software run on the pipeline, for example by means of general purpose PUT instructions executed on the pipeline, or a dedicated instruction type added to the instruction set of the pipeline 106. Alternatively the control register(s) may be pre-programmed by an external device.

By way of example, the static configuration could include the ability to mark a subset of cache ways (sections of the cache) as being for uncompressed lines only. This would simplify the process of allocating a new uncompressed cacheline in the cache (as only one uncompressed cacheline would need to be evicted to make room for the new cacheline, as opposed to evicting a plurality of compressed cachelines).

Another possibility would be to statically control which cachelines are compressed by having software mark some memory regions as compressible and some memory regions as non-compressible in the memory attributes for those regions—similar to how some memory regions are marked as cacheable and some memory regions are marked as non-cacheable. This kind of static configuration would involve programming page table information accordingly, rather than writing to control registers within the processor. This would mean that instead of configuring the cache to allow compression for some entries and not others, all entries could be allowed to store compressed cachelines but whether compression is attempted depends on the memory attributes associated with the memory region. This would allow software to mark regions that it expects to be amenable to compression as compressible (e.g. certain data sets) and mark other regions that it does not expect to be amenable to compression as not compressible (e.g. memory regions that contain instructions). Thus there are various options for allowing static configuration.

Being dynamically configurable on the other hand means allowing the cache logic 108 to determine automatically, for each cache entry, whether the data is compressible or not, and if so, in some embodiments also to specify what compression scheme to use.

In the dynamic case, then another field will be included for each cache entry to specify the selection for the individual respective entry (e.g. a flag to indicate whether compression used or not, or two or more bits to also be able to specify the compression algorithm used, or other information required for decompression). This field could be part of the tag RAM 202a, flexible RAM 202b, data RAM 201 or a separate RAM or other storage means, such as registers. Although extra bits will need to be stored somewhere to indicate what compression algorithm was used, there is also an added benefit in that having the flexibility to use more bits for this will expand the number of compression algorithms that can be supported.

Figure 7:
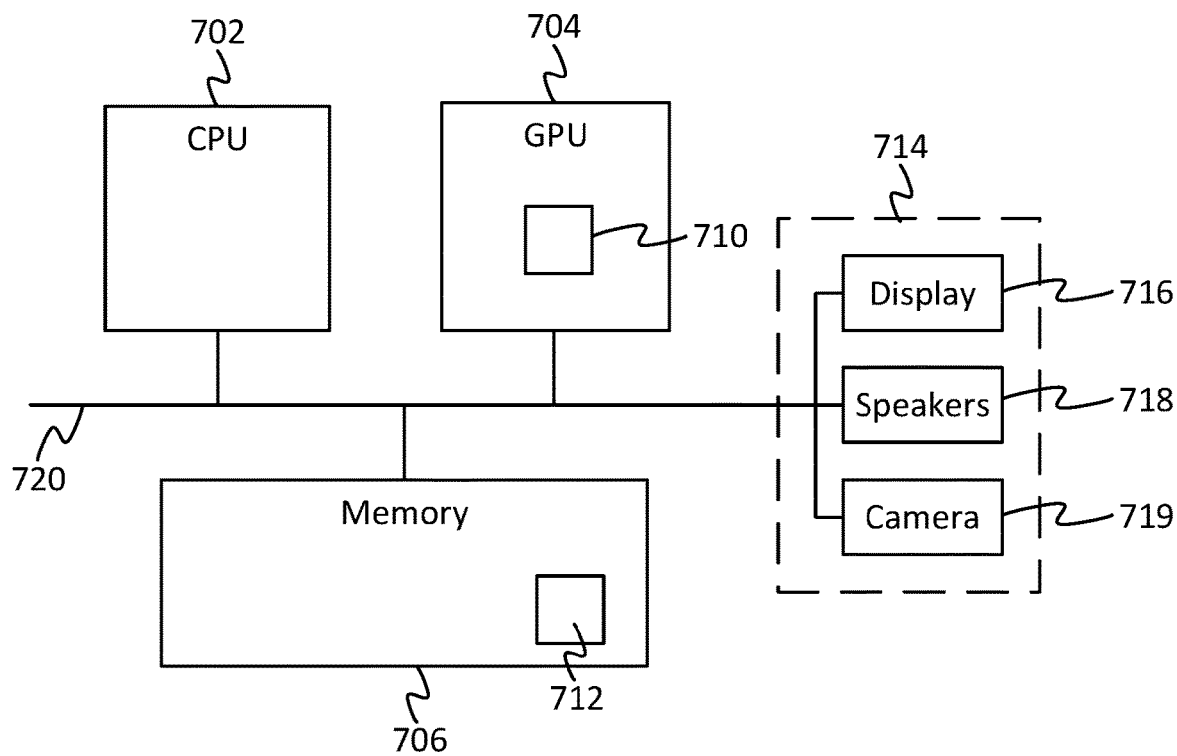
FIG. 7 is a schematic block diagram of a computer system in which the disclosed device or data processing system is implemented.

FIG. 7 shows a computer system in which the device described herein may be implemented. The computer system comprises a CPU 702, a GPU 704, a memory 706 and other devices 714, such as a display 716, speakers 718 and a camera 719. A processing block 710 is implemented on the GPU 704. In other examples, the processing block 710 may be implemented on the CPU 702. Either way the processing device 102 may be comprised by the processing block 710 of FIG. 7. The components of the computer system can communicate with each other via a communications bus 720. The memory 104 of FIG. 1 may be comprised by the memory 710 of FIG. 7, or alternatively may be comprised as an internal component of the GPU or CPU, or a combination.

The processing device 102 and system 100 of FIGS. 1 to 7 are shown as comprising a number of functional blocks. This is schematic only and is not intended to define a strict division between different logic elements of such entities. Each functional block may be provided in any suitable manner. It is to be understood that intermediate values described herein as being formed by a processing device 102 or system 100 need not be physically generated by the processing device or system at any point and may merely represent logical values which conveniently describe the processing performed by the processing device or system between its input and output.

The processing device 102 or system 100 described herein may be embodied in hardware on an integrated circuit. The processing device or system described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the manufacturing system to manufacture a processing device or system configured to perform any of the methods described herein, or to manufacture a processing device or system comprising any apparatus described herein. An integrated circuit definition dataset may be, for example, an integrated circuit description.

Therefore, there may be provided a method of manufacturing, at an integrated circuit manufacturing system, a processing device or as described herein. Furthermore, there may be provided an integrated circuit definition dataset that, when processed in an integrated circuit manufacturing system, causes the method of manufacturing a processing device or system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the manufacturing system to manufacture a processing device 102 or system 100 will now be described with respect to FIG. 8.

Figure 8:
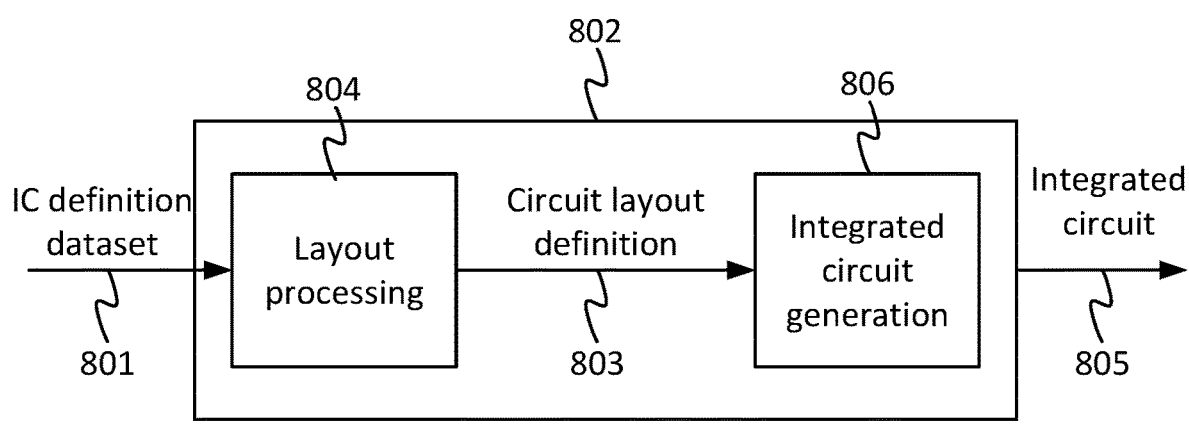
FIG. 8 is a schematic block diagram of an integrated circuit manufacturing system for generating an integrated circuit embodying the disclosed device or data processing system.

FIG. 8 shows an example of an integrated circuit (IC) manufacturing system 802 which is configured to manufacture a device (e.g. processing device) or data processing system as described in any of the examples herein. In particular, the IC manufacturing system 802 comprises a layout processing system 804 and an integrated circuit generation system 806. The IC manufacturing system 802 is configured to receive an IC definition dataset 801 (e.g. defining a processing device 102 or system 100 as described in any of the examples herein), process the IC definition dataset, and generate an IC according to the IC definition dataset (e.g. which embodies a device 102 or data processing system 100 as described in any of the examples herein). The processing of the IC definition dataset configures the IC manufacturing system 802 to manufacture an integrated circuit embodying a processing device 102 or system 100 as described in any of the examples herein.

The layout processing system 804 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 804 has determined the circuit layout it may output a circuit layout definition 803 to the IC generation system 1006. A circuit layout definition may be, for example, a circuit layout description.

The IC generation system 806 generates an IC 805 according to the circuit layout definition, as is known in the art. For example, the IC generation system 806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 806 may be in the form of computer-readable code which the IC generation system 806 can use to form a suitable mask for use in generating an IC.

The different processes performed by the IC manufacturing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the manufacturing system to manufacture a device 102 or data processing system 100 without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device or system as described herein. For example, the configuration of an integrated circuit manufacturing system in the manner described above with respect to FIG. 8 by an integrated circuit manufacturing definition dataset may cause a device or system as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

According to a first aspect disclosed herein, there is provided a device comprising: cache RAM comprising first RAM and second RAM; and caching circuitry arranged to perform caching operations in response to memory access operations, each caching operation caching a respective cacheline and corresponding tag in the cache RAM; wherein: the first RAM comprises a plurality of fields of an architecturally defined width, and the second RAM comprises a plurality of respective fields also of architecturally defined width, each field in the first RAM together with the respective field in the second RAM forming a respective entry of the cache RAM; the caching circuitry is operable to use the respective field in the first RAM to hold a first portion of a single cacheline, and the respective field in the second RAM to hold the corresponding tag of the single cacheline and a remaining portion of the single cacheline; and the caching circuitry is arranged so as, upon a cache hit by a subsequent memory access operation requesting to access data for which a corresponding cacheline has already been cached, to retrieve the corresponding tag and the remaining portion of the respective cacheline from the second RAM in a first one of a sequence of clock cycles.

In embodiments of the first aspect, the caching circuitry may be further arranged to determine whether the subsequent memory access operation is satisfied by the remaining portion of the respective cacheline.

In embodiments of the first aspect, if the subsequent memory access operation is satisfied by the remaining portion of the respective cacheline, the caching circuitry is may be arranged output data from the remaining portion.

In embodiments of the first aspect, the caching circuitry may be arranged to not retrieve the first portion of the respective cacheline from the first RAM in a successive one of the clock cycles.

In embodiments of the first aspect, if the subsequent memory access operation is not satisfied by the remaining portion of the respective cacheline, then the device may be further arranged to retrieve the first portion of the respective cacheline from the first RAM in a successive one of the clock cycles and output data from the first portion.

In embodiments of the first aspect, the first RAM may be implemented in a separate RAM unit than the second RAM.

Alternatively, in embodiments of the first aspect, the second RAM may be incorporated within a single RAM unit.

In embodiments of the first aspect, the caching circuitry may be operable to select a further mode of operation in which the first RAM is used to hold a plural number of the cachelines in a compressed format, and the corresponding entry in the second RAM is used to hold the corresponding tags of the plural number of cachelines.

In embodiments of the first aspect, the second RAM may comprise two constituent RAM units, a dedicated tag RAM unit and a flexible RAM unit, each field in the second RAM comprising a respective subfield in the tag RAM unit and a respective subfield in the flexible RAM unit; and the cache circuitry may use the respective subfield in the tag RAM unit to hold the corresponding tag of the single cacheline, and the respective field in the flexible RAM unit to cache the remaining portion of the single cacheline; or, if the further mode of operation is selected, the caching circuitry may use the respective subfield in the tag RAM unit to hold the tag of one of the plurality of cachelines, and the respective subfield in the flexible RAM unit to hold the tags of the rest of the plurality of cachelines.

In embodiments of the first aspect, if the further mode is selected, the selection may comprise selecting between different sub-modes of the further mode which differ by one or both of: —having different variations of the second format, or—having different values of said plural number.

In embodiments of the first aspect, the different sub-modes of the further mode may comprise different variations of the compressed format wherein the different variations of the compressed format comprise different compression schemes.

In embodiments of the first aspect, the different sub-modes of the further mode may use different compression schemes and have different values of said plural number, one of the sub-modes of the further mode caching fewer cachelines in the respective field of the first RAM than another of the sub-modes of the further mode, and using spare bits in the respective field of the second RAM to store additional information for use in decompressing the plural number of cachelines and/or to store partial compressed cacheline data.

In embodiments of the first aspect, the caching circuitry may be operable to select the further mode across a group of some or all of the entries.

In embodiments of the first aspect, the operability of the caching circuitry to select the further mode across the group may comprises one of:
  being operable only to make the same selection for all of the entries in the group as a whole, the same selection being applied to each entry in the group;
  being operable to make the selection independently for each of a plurality of subgroups of entries within the group, each subgroup comprising more than one entry to which the same selection is applied within the subgroup; and
  being operable to make the selection independently for each individual one of entries within the group.

In embodiments of the first aspect, the caching circuitry may be operable to configure the selection of the further mode by means of one or more programmable control registers of the processing device, or one or more input configuration pins, as a setting to apply statically over multiple of the caching operations.

In embodiments of the first aspect, a data processing system may comprise the device of any preceding claim, and an execution unit and memory, wherein the memory access operations are operations to retrieve data from the memory and are performed by the execution unit or other component of the processing device.

According to a second aspect disclosed herein, there is provided. a device comprising: cache RAM comprising first RAM and second RAM; and caching circuitry arranged to perform caching operations in response to memory access operations, each caching operation caching a respective cacheline and corresponding tag in the cache RAM;

wherein: the first RAM comprises a plurality of fields of an architecturally defined width, and the second RAM comprises a plurality of respective fields also of architecturally defined width, each field in the first RAM together with the respective field in the second RAM forming a respective entry of the cache RAM; the caching circuitry is operable to make a selection between applying a first mode and a second mode in at least one of the entries in the cache RAM; when the first mode is applied, the respective field in the first RAM is used to hold a first portion of a single cacheline in a first format, and the respective field in the second RAM is used to hold the corresponding tag of the single cacheline and a remaining portion of the single cacheline; and when the second mode is applied, the first RAM is used to hold a plural number of cachelines in a second format shorter than the first format, and the corresponding entry in the second RAM is used to hold the corresponding tags of the plural number of cachelines.

In embodiments of the second aspect, the first format may be an uncompressed form, and the second format may be a compressed form.

In embodiments of the second aspect, the first RAM may be implemented in a is separate RAM unit than the second RAM. In embodiments, the second RAM may be incorporated within a single RAM unit.

In alternative embodiments of the second aspect, the second RAM may comprise two constituent RAM units, a dedicated RAM unit and a flexible RAM unit, each field in the second RAM comprising a respective subfield in the tag RAM unit and a respective subfield in the flexible RAM unit. In such embodiments, in the first mode, the cache circuitry uses the respective subfield in the tag RAM unit to hold the corresponding tag of the single cacheline, and the respective field in the flexible RAM unit to cache the remaining portion of the single cacheline; and in the second mode, the caching circuitry uses the respective subfield in the tag RAM unit to hold the tag of one of the plurality of cachelines, and the respective subfield in the flexible RAM unit to hold the tags of the rest of the plurality of cachelines.

In embodiments of the second aspect, said plural number may be three, and said first portion may be three quarters.

In embodiments of the second aspect, the selection may further comprise, if the second mode is selected, selecting between different sub-modes of the second mode which differ by one or both of: having different variations of the second format, or having different values of said plural number.

In embodiments of the second aspect, the different sub-modes of the second mode may comprise different variations of the second format wherein the different variations of the second format comprise different compression schemes.

In embodiments of the second aspect, the different sub-modes of the second mode may use different compression schemes and have different values of said plural number, one of the sub-modes of the second mode caching fewer cachelines in the respective field of the first RAM than another of the sub-modes of the second mode, and using spare bits in the respective field of the second RAM to store additional information for use in decompressing the plural number of cachelines and/or to store partial compressed cacheline data.

In embodiments of the second aspect, the selection may further comprise, if the first mode is selected, selecting between different sub-modes of the first mode which differ by one or both of: having different variations of the first format, or having different sizes of the first portion relative to the remaining portion.

In embodiments of the second aspect, the caching circuitry may be operable to make the selection across a group of some or all of the entries.

In embodiments of the second aspect, the operability of the caching circuitry to make the selection across the group may comprise: being operable only to make the same selection for all of the entries in the group as a whole, the same selection being applied to each entry in the group.

Alternatively, in embodiments of the second aspect the operability of the caching circuitry to make the selection across the group may comprise: being operable to make the selection independently for each of a plurality of subgroups of entries within the group, each subgroup comprising more than one entry to which the same selection is applied within the subgroup.

Alternatively, in embodiments of the second aspect the operability of the caching circuitry to make the selection for the group may comprise: being operable to make the selection independently for each individual one of entries within the group.

In embodiments of the second aspect, the caching circuitry may be operable to make the selection for selected memory regions.

In embodiments of the second aspect, the caching circuitry may be operable to configure the selection by means of one or more programmable control registers of the processing device, or one or more input configuration pins, as a setting to apply statically over multiple of the caching operations.

In embodiments of the second aspect, the caching circuitry may be configured to make the selection dynamically for the individual respective entry upon each individual caching operation, wherein an additional field associated with each entry in the group records which mode is used for the respective entry.

In embodiments of the second aspect, a respective one or more further fields may be associated with each entry in the group to record which sub-mode is used for the respective entry.

In embodiments of the first or second aspect there may be provided a data processing system comprising the device, and an execution unit and memory, wherein the memory access operations are operations to retrieve data from the memory and are performed by the execution unit or other component of the processing device.

The first and second aspects may be used together or independently. Any feature of any embodiment of the second aspect may be combined with the first aspect and any feature of any embodiment of the first aspect may be combined with the second aspect.

According to further aspects disclosed herein, there may be provided a corresponding method of operating the processing device or system, and a corresponding computer program configured to operate the processing device or system. According to yet further aspects there may be provided a corresponding method of manufacturing the processing device or system, a corresponding manufacturing facility arranged to manufacture the processing device or system, and a corresponding circuit design data set embodied on computer-readable storage.

For instance according to one aspect there may be provided a non-transitory computer readable storage medium having stored thereon a computer readable description of the processing device or system of any embodiment herein which, when processed in an integrated circuit manufacturing system, causes the integrated circuit manufacturing system to: process, using a layout processing system, the computer readable description of the processing device or system so as to generate a circuit layout description of an integrated circuit embodying said processing device or system; and manufacture, using an integrated circuit generation system, the processing device or system according to the circuit layout description.

According to another aspect, there may be provided an integrated circuit manufacturing system comprising: a non-transitory computer readable storage medium having stored thereon a computer readable description of the processing device or system of any embodiment disclosed herein; a layout processing system configured to process the computer readable description so as to generate a circuit layout description of an integrated circuit embodying said processing device or system; and an integrated circuit generation system configured to manufacture the processing device or system according to the circuit layout description.

According to another aspect there may be provided a method of manufacturing, using an integrated circuit manufacturing system, a processing device or system of any embodiment disclosed herein, the method comprising: processing, using a layout processing system, a computer readable description of said circuit so as to generate a circuit layout description of an integrated circuit embodying the processing device or system; and manufacturing, using an integrated circuit generation system, the processing device or system according to the circuit layout description.

According to another aspect there may be provided a layout processing system configured to determine positional information for logical components of a circuit derived from the integrated circuit description so as to generate a circuit layout description of an integrated circuit embodying the processing device or system of any embodiment disclosed herein.

Other variants, implementations and/or applications of the disclosed techniques may become apparent to a person skilled in the art once given the disclosure herein. The scope of the present disclosure is not limited by the above-described embodiments but only by the claims.

What is claimed is:

1. A device comprising:
   cache RAM comprising first RAM and second RAM; and
   caching circuitry arranged to perform caching operations in response to memory access operations, each caching operation caching a respective cacheline and corresponding tag in the cache RAM; wherein:
   the first RAM comprises a plurality of fields of an architecturally defined width, and the second RAM comprises a plurality of respective fields also of architecturally defined width, each field in the first RAM together with the respective field in the second RAM forming a respective entry of the cache RAM;
   the caching circuitry is operable, in a first mode of operation, to use the respective field in the first RAM to hold a first portion of a single cacheline, and the respective field in the second RAM to hold the corresponding tag of the single cacheline and a remaining portion of the single cacheline; and
   the caching circuitry is arranged so as, upon a cache hit by a subsequent memory access operation requesting to access data for which a corresponding cacheline has already been cached, to retrieve the corresponding tag and the remaining portion of the respective cacheline from the second RAM in a first one of a sequence of clock cycles.

2. The device of claim 1, wherein the caching circuitry is further arranged to determine whether the subsequent memory access operation is satisfied by the remaining portion of the respective cacheline.

3. The device of claim 2, wherein, if the subsequent memory access operation is satisfied by the remaining portion of the respective cacheline, the caching circuitry is arranged to output data from the remaining portion.

4. The device of claim 3, wherein the caching circuitry is arranged to not retrieve the first portion of the respective cacheline from the first RAM in a successive one of the clock cycles.

5. The device of claim 2, wherein, if the subsequent memory access operation is not satisfied by the remaining portion of the respective cacheline, then the device is further arranged to retrieve the first portion of the respective cacheline from the first RAM in a successive one of the clock cycles and output data from the first portion.

6. The device of claim 1, wherein the first RAM is implemented in a separate RAM unit than the second RAM.

7. The device of claim 1, wherein the second RAM is incorporated within a single RAM unit.

8. The device of claim 1, wherein the caching circuitry is operable to select a further mode of operation in which the first RAM is used to hold a plural number of the cachelines in a compressed format, and the corresponding entry in the second RAM is used to hold the corresponding tags of the plural number of cachelines.

9. The device of claim 8, wherein:
   the second RAM comprises two constituent RAM units, a dedicated tag RAM unit and a flexible RAM unit, each field in the second RAM comprising a respective subfield in the tag RAM unit and a respective subfield in the flexible RAM unit; and
   the cache circuitry uses the respective subfield in the tag RAM unit to hold the corresponding tag of the single cacheline, and the respective field in the flexible RAM unit to cache the remaining portion of the single cacheline; or, if the further mode of operation is selected, the caching circuitry uses the respective subfield in the tag RAM unit to hold the tag of one of the plurality of cachelines, and the respective subfield in the flexible RAM unit to hold the tags of the rest of the plurality of cachelines.

10. The device of claim 8, wherein if the further mode is selected, the selection comprises selecting between different sub-modes of the further mode which differ by one or both of:
    having different variations of the compressed format, or
    having different values of said plural number.

11. The device of claim 10, wherein the different sub-modes of the further mode comprise different variations of the compressed format, wherein the different variations of the compressed format comprise different compression schemes.

12. The device of claim 11, wherein the different sub-modes of the further mode use different compression schemes and have different values of said plural number, one of the sub-modes of the further mode caching fewer cachelines in the respective field of the first RAM than another of the sub-modes of the further mode, and using spare bits in the respective field of the second RAM to store additional information for use in decompressing the plural number of cachelines and/or to store partial compressed cacheline data.

13. The device of claim 8, wherein the caching circuitry is operable to select the further mode across a group of some or all of the entries.

14. The device of claim 13, wherein the operability of the caching circuitry to select the further mode across the group comprises one of:
- being operable only to make the same selection for all of the entries in the group as a whole, the same selection being applied to each entry in the group;
- being operable to make the selection independently for each of a plurality of subgroups of entries within the group, each subgroup comprising more than one entry to which the same selection is applied within the subgroup; and
- being operable to make the selection independently for each individual one of entries within the group.

15. The device of claim 8, wherein the caching circuitry is operable to configure the selection of the further mode by means of one or more programmable control registers of the processing device, or one or more input configuration pins, as a setting to apply statically over multiple of the caching operations.

16. A data processing system comprising the device as set forth in claim 1, and an execution unit and memory, wherein the memory access operations are operations to retrieve data from the memory and are performed by the execution unit or other component of the processing device.

17. A method of manufacturing, using an integrated circuit manufacturing system, a device as set forth in claim 1, the method comprising:
- processing, using a layout processing system, a computer readable dataset description of said device so as to generate a circuit layout description of an integrated circuit embodying the device; and
- manufacturing, using an integrated circuit generation system, the device according to the circuit layout description.

18. A non-transitory computer readable storage medium having stored thereon a computer readable dataset description of a device as set forth in claim 1 that, when processed in an integrated circuit manufacturing system, causes the integrated circuit manufacturing system to manufacture an integrated circuit embodying the device.

19. A method of operating a processing device that comprises cache RAM comprising first RAM and second RAM, the first RAM comprising a plurality of fields of an architecturally defined width, and the second RAM comprising a plurality of respective fields also of architecturally defined width, each field in the first RAM together with the respective field in the second RAM forming a respective entry of the cache RAM; the method comprising:
- caching a cacheline and corresponding tag such that the respective field in the first RAM holds a first portion of the cacheline, and the respective field in the second RAM to holds the corresponding tag of the cacheline and a remaining portion of the cacheline; and
- upon a cache hit by a subsequent memory access operation requesting to access data for which a corresponding cacheline has already been cached, retrieving the corresponding tag and the remaining portion of the respective cacheline from the second RAM in a first one of a sequence of clock cycles.

20. A non-transitory computer readable storage medium having stored thereon computer readable code configured to cause a method of operating a processing device to be performed when run, the device including cache RAM comprising a first RAM and a second RAM, the first RAM comprising a plurality of fields of an architecturally defined width, and the second RAM comprising a plurality of respective fields also of architecturally defined width, each field in the first RAM together with the respective field in the second RAM forming a respective entry of the cache RAM; the method comprising:
- caching a cacheline and corresponding tag such that the respective field in the first RAM holds a first portion of the cacheline, and the respective field in the second RAM to holds the corresponding tag of the cacheline and a remaining portion of the cacheline; and
- upon a cache hit by a subsequent memory access operation requesting to access data for which a corresponding cacheline has already been cached, retrieving the corresponding tag and the remaining portion of the respective cacheline from the second RAM in a first one of a sequence of clock cycles.

* * * * *